Nov. 3, 1970     T. R. SMITH     3,537,275
FLEXIBLE COUPLING
Filed Nov. 13, 1968
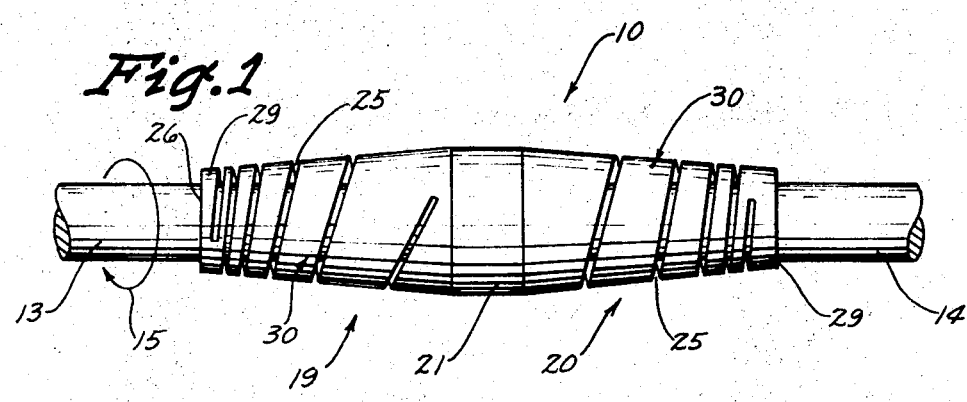
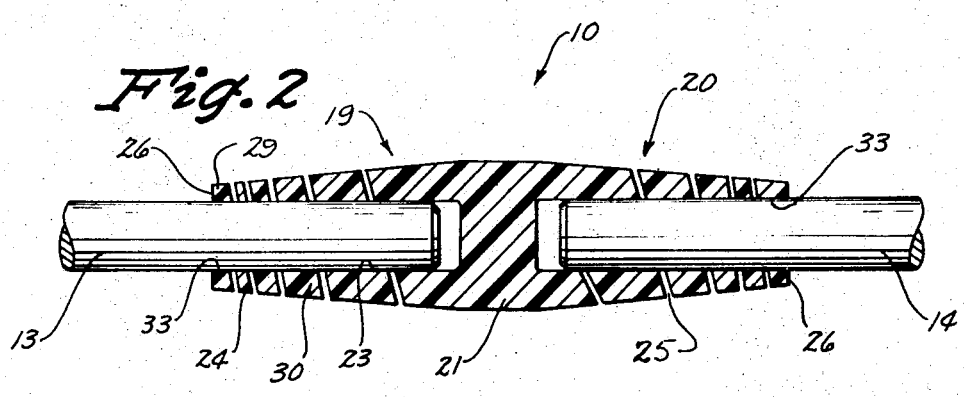
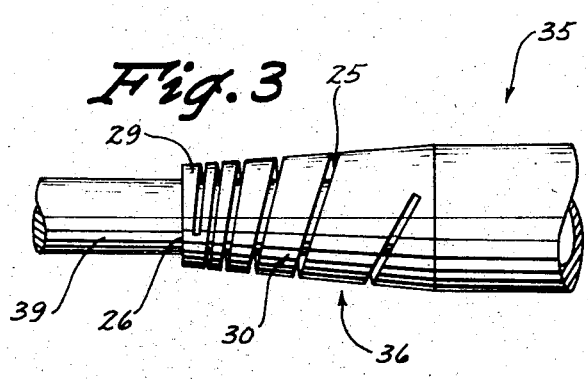
INVENTOR
THOMAS R. SMITH
BY
William G. Landwier
AGENT United States Patent Office 3,537,275
Patented Nov. 3, 1970

3,537,275
FLEXIBLE COUPLING
Thomas R. Smith, Jasper, Iowa, assignor to The Maytag Company, Newton, Iowa, a corporation of Delaware
Filed Nov. 13, 1968, Ser. No. 775,339
Int. Cl. F16d 3/12, 3/14
U.S. Cl. 64—11                                                         10 Claims

ABSTRACT OF THE DISCLOSURE

A flexible coupling is constructed of an elastomer material, such as polyurethane, in the form of a sleeve having a spiral-like slot extending along a portion of the sleeve beginning at a position spaced axially from one end of the sleeve and extending for more than one circumference of the sleeve to form an annular end ring and a flexible spiral portion. The end ring is frictionally engageable with a shaft and responsive to rotation of the shaft for effecting frictional engagement of the flexible spiral portion with the shaft for transmitting torque through the coupling.

BACKGROUND OF THE INVENTION

Field of the invention

This invention relates to a flexible coupling and more particularly to a unitary coupling having a flexible spiral portion engageable with a shaft for transmitting torque from a driving member to a driven member.

Description of the prior art

Prior art includes numerous attempts directed to providing a flexible coupling member connectable between driving and driven shafts for transmitting torque from the driving to the driven shaft while accommodating a misalignment between the shafts. A large portion of the coupling devices have taken the form of coil springs securely connected at the ends to the driving and driven shafts with the intermediate spiral portion being spaced from the shafts. A problem encountered by many of the prior coupling devices is related to obtaining the proper degree of resiliency of the flexible coupling to accommodate the torque transmission and the misalignment. In addition, prior coil spring clutch devices have encountered problems which resulted in erratic transmission of rotational motion.

SUMMARY OF THE INVENTION

It is an object of the instant invention to provide an improved flexible coupling operable for transmitting torque from a driving member to a driven member with a smooth continuous transmission of torque.

It is a further object of this invention to provide a flexible clutch coupling frictionally engageable with a driving member and responsive to rotation of the driving member for effecting an increasing rate of torque transmission through the flexible coupling.

It is a further object of the instant invention to provide a unitary flexible clutch coupling including a flexible spiral portion engageable with a shaft member and responsive to rotation of the shaft for effecting torque transmission.

It is a further object of the instant invention to provide a unitary flexible coupling formed of an elastomer and including an end portion frictionally engageable with a driving shaft and further including a flexible spiral portion responsive to rotation of the driving shaft for frictional torque transmission engagement.

The coupling disclosed in this application achieves these objects in a sleeve having a spiral-like slot forming a flexible spiral portion and an end portion wherein the end portion has a frictional engagement with the shaft and is operable for effecting frictional engagement of the spiral portion with the shaft to in turn effect torque transmission from the driving shaft through the coupling.

Operation of the device and further objects and advantages thereof will become evident as the description proceeds and from an examination of the accompanying page of drawings.

BRIEF DESCRIPTION OF THE DRAWINGS

The accompanying drawings illustrate a preferred and an alternate embodiment of the invention and in the drawings similar numerals refer to similar parts throughout the three views, wherein:

FIG. 1 is a view of the preferred embodiment of the instant invention showing the exterior longitudinal view of the coupling forming the subject matter of the instant invention;

FIG. 2 is a longitudinal sectional view of the coupling of FIG. 1; and

FIG. 3 is a longitudinal view similar to FIG. 1 showing an alternate embodiment of the coupling of the instant invention.

DESCRIPTION OF THE PREFERRED EMBODIMENT

Referring to FIGS. 1 and 2 there is shown a coupling member 10 connecting a driving member in the form of a shaft 13 and a driven member in the form of a shaft 14. The direction of rotation of the driving shaft is shown by the arrow 15 in FIG. 1. The coupling member 10 is a unitary member formed of an elastomer material such as polyurethane and has a telescoping relationship with the driving and driven shafts 13 and 14. There are no mechanical connectors such as pins or screws but the coupling 10 is frictionally engageable with the shafts for transmitting torque in a manner as will be shown hereinafter.

It is noted that the coupling 10 of FIGS. 1 and 2 includes similar sleeves 19 and 20 at the ends and therefore a description of one of the ends is sufficient to describe the construction and operation of each end. In the construction shown the intermediate or center portion 21 between the sleeves 19 and 20 is solid across the diameter but it is recognized that this portion might also be tubular. Each sleeve, such as 19, is shown with a substantially uniform inner diameter 23 and a tapered outer diameter 24 to form a wall having an increasing thickness extending from the end toward the center portion 21 in FIG. 2.

Each sleeve, such as 19, includes a spiral-like slot 25 beginning at a point spaced from the outer end 26 of the sleeve and proceeding toward the center portion 21 of the coupling 10 along a path of increasing pitch. There is thus formed an annular ring 29 at the outer narrow end 26 of the sleeve and a flexible spiral portion 30. The spiral portion 30 may also be described as a beam wrapped loosely about the shaft and having increasing width or axial dimension as the spiral proceeds axially toward the center portion 21.

The annular end ring 29 is sized so that upon assembly to the shaft 13, for example, there is a tight fit of the inner diameter 33 of the annular end ring 29 on the shaft 13. This tight fit provides a frictional engagement of the end ring 29 with the shaft.

The shaft 13, for example, may extent beyond the spiral portion 30 into an unslotted portion of the sleeve 19 for generally supporting and aligning the sleeve on the shaft and for preventing a collapsing of the spiral portion 30 off the end of the shaft 13 when excessive torque is applied to the coupling.

Upon rotation of the driving shaft 13, the frictional engagement of the end ring 29 with the shaft 13 will transmit a force to the spiral portion 30 so that the spiral portion 30 will tend to wrap around the shaft 13 with an increasing degree of frictional engagement for effecting torque transmission through the coupling 10. It is noted that the initial end of the beam or spiral portion 30, in which the wall thickness and axial dimension are at a minimum, will permit a sensitive pickup of the torque and as rotation proceeds the pickup of sequential sections of the spiral portion 30 will proceed from the thinner narrower end toward the thicker wider section near the center portion 21 so as to achieve an increasing rate of torque transmissibility. There will be a substantially exponential buildup of frictional engagement and torque transmissibility between the shaft 13 and the spiral portion 30 of the coupling 10.

It is thus seen that the increasing wall thickness and the increasing pitch of the slot provide an increasing cross section of the wrapped beam or spiral portion 30 toward the center portion 21 to permit the carrying or transmitting of the load or torque through the coupling 10.

As described hereinabove, the coupling 10 shown in FIG. 1 includes an end ring 29 and a spiral portion 30 at both ends of the coupling 10. The sleeve 20 engageable with the driven shaft 14 is slotted so that the drag or inertia of the driven shaft 14 on the end ring 29 effects a wrap-up of the spiral portion 30 on the driven shaft 14 to complete the torque transmission path through the coupling 10. In operation, if the driven shaft 14 tends to overrun the coupling 10, the spiral portion 30 will tend to unwrap from the driven shaft 14 and begin to decrease the frictional engagement and torque transmissibility. As the reduced torque transmission results in a slowing of the driven shaft 14, the spiral portion 30 will re-engage for effecting continued torque transmission.

FIG. 3 shows an alternate embodiment for the coupling in which a coupling 35 comprises a single sleeve 36 engageable with a driving or driven member 39 and operable in a manner as described above to effect torque transmission through the coupling 35.

It is thus seen that the instant invention provides an improved coupling member formed of an elastomer having distinct improvements over the prior art in the area of operability for transmitting torque from a driving to a driven member while achieving distinct advantages in the fabrication and assembly of the coupling member.

In the drawings and specification, there has been set forth a preferred embodiment of the invention and although specific terms are employed, these are used in a generic and descriptive sense only and not for purposes of limitation. Changes in form and the proportion of parts as well as the substitution of equivalents are contemplated as circumstances may suggest or render expedient, without departing from the spirit or scope of this invention as further defined in the following claims.

I claim:

1. A torque transmission coupling for a shaft comprising a sleeve having a spiral-like slot extending along a portion of the sleeve for more than one circumference of the sleeve to form a flexible spiral portion engageable with said shaft, said sleeve further including an annular ring portion at one end of said sleeve having frictional engagement with said shaft for producing a frictional drag between said shaft and said sleeve upon rotation of one of said shaft and said sleeve, said ring portion being operable through said frictional drag for effecting frictional engagement of said spiral portion with said shaft for transmitting torque through said coupling.

2. A torque transmission coupling as defined in claim 1 wherein said sleeve is formed entirely of a flexible elastomer.

3. A torque transmission coupling as defined in claim 1 wherein said slot begins at a position spaced axially from one end of the sleeve and wherein said ring portion forms an unbroken annular end ring having frictional engagement with the outside surface of said shaft.

4. A unitary elastomeric torque transmission coupling for a shaft comprising a sleeve having a spiral-like slot extending along a portion of the sleeve, said slot beginning at a position spaced axially from one end of the sleeve and extending for more than one circumference of the sleeve to form as a part of said sleeve an annular unbroken end ring portion and a flexible spiral portion engageable with said shaft, said end ring portion having a frictional engagement with said shaft for producing a frictional drag between said shaft and said sleeve upon rotation of one of said shaft and said sleeve, said end ring portion being operable through said frictional drag for effecting frictional engagement of said spiral portion with said shaft for transmitting torque through said coupling.

5. A unitary elastomeric torque transmission coupling as defined in claim 4 and formed entirely of a urethane elastomer.

6. A torque transmission coupling as defined in claim 4 wherein said slot has increasing pitch along the sleeve to form a flexible spiral portion having sections of increasing axial dimension.

7. A torque transmission coupling as defined in claim 4 wherein said sleeve has a relatively thinner wall adjacent said end ring portion and in increasing wall thickness along said flexible spiral portion.

8. A torque transmission coupling as defined in claim 7 wherein said spiral-like slot has an increasing pitch to form a flexible spiral portion having sections of increasing axial width and radial thickness whereby said coupling achieves an increasing rate of torque transmissibility.

9. A torque transmission coupling for a pair of shafts comprising a sleeve at each end of the coupling with each sleeve having a spiral-like slot extending along the sleeve, each slot beginning at a position spaced axially from the outer end of the sleeve and extending for more than one circumference of the sleeve to form as part of each of said sleeves an annular unbroken end ring portion and a spiral flexible portion engageable with said shaft, each of said end ring portions having a frictional engagement with one of said shafts for producing a frictional drag between each of said shafts and the sleeve engageable therewith upon rotation of a first shaft, said end ring portions being operable through said frictional drag for effecting frictional engagement of said spiral portions with said shafts for transmitting torque from said first shaft through said coupling to the other shaft.

10. A torque transmission coupling as defined in claim 9 wherein each of said slots is variably spaced with an increasing pitch along the sleeve to form at each end of the coupling a flexible spiral portion having sections of increasing axial dimension toward the center of the coupling.

References Cited

UNITED STATES PATENTS

| 1,166,379 | 12/1915 | Ludlam | 192—41 |
| 2,297,619 | 9/1942 | Haberstump | 64—11 |
| 2,574,714 | 11/1951 | Smith | 64—15 XR |
| 2,792,694 | 5/1957 | Merel | 64—11 |
| 3,018,125 | 1/1962 | Cain | 64—15 XR |
| 3,068,666 | 12/1962 | Sabadash | 64—15 |
| 3,390,546 | 7/1968 | Jewell | 64—15 |

FOREIGN PATENTS 25,022  10/1935  Australia.

JAMES A. WONG, Primary Examiner

U.S. Cl. X.R.

64—27; 192—41, 107